(12) United States Patent
Wang et al.

(10) Patent No.: US 12,742,425 B2
(45) Date of Patent: Sep. 22, 2026

(54) ANTI-STALL SYSTEM WITH A FUEL CELL

(71) Applicant: General Electric Company, Schenectady, NY (US)

(72) Inventors: Honggang Wang, Clifton Park, NY (US); Michael Anthony Benjamin, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 11 days.

(21) Appl. No.: 17/684,677

(22) Filed: Mar. 2, 2022

(65) Prior Publication Data

US 2023/0278714 A1 Sep. 7, 2023

(51) Int. Cl.
*F02C 9/28* (2006.01)
*B64D 27/10* (2006.01)
(Continued)

(52) U.S. Cl.
CPC ................ *F02C 9/28* (2013.01); *B64D 27/10* (2013.01); *B64D 27/33* (2024.01); *B64D 27/355* (2024.01);
(Continued)

(58) Field of Classification Search
None
See application file for complete search history.

(56) References Cited

U.S. PATENT DOCUMENTS 2,911,033 A * 11/1959 Eley .......................... F02D 1/04 60/243
3,426,322 A * 2/1969 Balo ....................... F04D 27/02 340/439
(Continued)

FOREIGN PATENT DOCUMENTS

CN 106976405 A 7/2017
DE 102005012230 A1 10/2005
(Continued)

OTHER PUBLICATIONS

Mohammad Ali Azizi, Jacob Brouwer, Stall/surge dynamics of a multi-stage air compressor in response to a load transient of a hybrid solid oxide fuel cell-gas turbine system, Aug. 14, 2017, Journal of Power Sources 365 (2017) 408-418 (Year: 2017).*
(Continued)

*Primary Examiner* — Phutthiwat Wongwian
*Assistant Examiner* — Roberto Toshiharu Igue
(74) *Attorney, Agent, or Firm* — Dority & Manning, P.A.

(57) ABSTRACT

An anti-stall system for an aircraft may be provided, where the aircraft includes a propulsion system including a fuel cell assembly and a combustion engine, the combustion engine including a compressor section having a compressor. The anti-stall system may include at least one sensor configured to sense data indicative of at least one operating parameter indicative of a compressor stall condition of the compressor; and a controller including a processor and a memory storing instructions that when executed by the processor cause the controller to determine that the at least one operating parameter has achieved a compressor stall condition threshold and execute an anti-stall action responsive to determining that the at least one operating parameter has achieved the compression stall condition threshold. The anti-stall action may be configured to adjust at least one fuel cell parameter.

20 Claims, 10 Drawing Sheets

(51) Int. Cl.

| | |
|---|---|
| ***B64D 27/33*** | (2024.01) |
| ***B64D 27/355*** | (2024.01) |
| ***B64D 31/06*** | (2024.01) |
| ***B64D 31/18*** | (2024.01) |
| ***F02C 6/08*** | (2006.01) |
| ***F02C 9/32*** | (2006.01) |
| ***F02C 9/44*** | (2006.01) |
| ***H01M 8/04111*** | (2016.01) |
| *B64D 27/02* | (2006.01) |

(52) U.S. Cl.

CPC ............. *B64D 31/06* (2013.01); *B64D 31/18* (2024.01); *F02C 6/08* (2013.01); *F02C 9/32* (2013.01); *F02C 9/44* (2013.01); *H01M 8/04111* (2013.01); *B64D 27/026* (2024.01); *F05D 2220/323* (2013.01); *F05D 2220/76* (2013.01); *F05D 2270/101* (2013.01); *F05D 2270/335* (2013.01); *Y02T 90/40* (2013.01)

(56) References Cited

U.S. PATENT DOCUMENTS 3,658,279 A 4/1972 Robertson
3,759,091 A * 9/1973 Reimer .................. F02C 7/042 73/112.06
3,805,517 A 4/1974 Sewell et al.
4,083,235 A * 4/1978 Gallant ............... G01M 15/048 701/100
4,684,081 A 8/1987 Cronin
5,227,256 A 7/1993 Marianowski et al.
5,498,487 A 3/1996 Ruka et al.
5,581,995 A 12/1996 Lucenko et al.
5,858,314 A 1/1999 Hsu et al.
5,968,680 A 10/1999 Wolfe et al.
6,183,703 B1 2/2001 Hsu et al.
6,296,957 B1 10/2001 Graage
6,348,278 B1 2/2002 LaPierre et al.
6,550,717 B2 4/2003 MacCready et al.
6,630,264 B2 10/2003 Haltiner, Jr. et al.
6,641,084 B1 11/2003 Huber et al.
6,834,831 B2 12/2004 Daggett
7,279,243 B2 10/2007 Haltiner, Jr. et al.
7,285,350 B2 10/2007 Keefer et al.
7,380,749 B2 * 6/2008 Fucke ................ H01M 8/04111 429/513
7,456,517 B2 11/2008 Campbell et al.
7,470,477 B2 12/2008 Zizelman et al.
7,513,119 B2 4/2009 Zielinski et al.
7,578,136 B2 8/2009 Derouineau et al.
7,659,021 B2 2/2010 Horiuchi et al.
7,709,118 B2 5/2010 Lundberg
7,743,499 B2 6/2010 Pettit et al.
7,781,115 B2 8/2010 Lundberg
7,854,582 B2 12/2010 Ullyott
7,926,287 B2 4/2011 Ullyott et al.
7,966,801 B2 6/2011 Umeh et al.
7,966,830 B2 6/2011 Daggett
8,141,360 B1 3/2012 Huber
8,232,670 B2 7/2012 Breit et al.
8,268,510 B2 9/2012 Rock et al.
8,288,060 B2 10/2012 Bae et al.
8,309,270 B2 11/2012 Finnerty et al.
8,373,381 B2 2/2013 Raiser et al.
8,394,552 B2 3/2013 Gummalla et al.
8,524,412 B2 9/2013 Rock et al.
8,662,024 B2 3/2014 Leone
8,668,434 B2 3/2014 Karpman et al.
8,722,270 B2 5/2014 Pastula et al.
8,727,270 B2 5/2014 Burns et al.
8,732,532 B2 5/2014 Higeta
8,820,677 B2 9/2014 Rajashekara et al.
8,846,255 B2 9/2014 Dineen
8,875,519 B2 11/2014 Dooley
8,950,703 B2 2/2015 Bayliss et al.
9,005,847 B2 4/2015 Rock et al.
9,028,990 B2 5/2015 Gans et al.
9,054,385 B2 6/2015 Jones et al.
9,059,440 B2 6/2015 Hotto
9,068,748 B2 6/2015 Hoke
9,118,054 B2 8/2015 Gummalla et al.
9,347,379 B2 5/2016 Dooley
9,359,956 B2 6/2016 Dooley
9,435,230 B2 9/2016 Kim et al.
9,444,108 B2 9/2016 Brousseau
9,464,573 B2 10/2016 Remy et al.
9,541,001 B2 1/2017 Steinwandel et al.
9,604,730 B2 3/2017 Hagh et al.
9,617,006 B2 4/2017 Brugger et al.
9,666,888 B2 5/2017 Nagai et al.
9,777,638 B2 10/2017 Freidl
9,897,041 B2 2/2018 Hoffijann et al.
9,966,619 B2 5/2018 Libis et al.
10,008,726 B2 6/2018 Leah et al.
10,035,607 B2 7/2018 Wangemann et al.
10,069,150 B2 9/2018 Mata et al.
10,224,556 B2 3/2019 Lents et al.
10,247,032 B2 4/2019 Gill et al.
10,318,003 B2 6/2019 Gannon et al.
10,443,504 B2 10/2019 Dalal
10,446,858 B2 10/2019 Palumbo et al.
10,487,839 B2 11/2019 Kupiszewski et al.
10,622,653 B2 4/2020 Whyatt et al.
10,641,179 B2 5/2020 Hayama et al.
10,644,331 B2 5/2020 Stoia et al.
10,671,092 B2 6/2020 DiRusso et al.
10,676,208 B2 6/2020 Wangemann et al.
10,724,432 B2 7/2020 Shapiro et al.
10,737,802 B2 8/2020 Krug et al.
10,762,726 B2 9/2020 Gansler et al.
10,766,629 B2 9/2020 Mercier-Calvairac et al.
10,774,741 B2 9/2020 Sennoun
10,814,992 B2 10/2020 Halsey et al.
10,815,904 B2 10/2020 Cafaro et al.
10,913,543 B2 2/2021 Bailey et al.
10,919,635 B2 2/2021 Edgar et al.
10,967,984 B2 4/2021 Willford et al.
10,978,723 B2 4/2021 Lo et al.
11,101,677 B2 8/2021 Shih et al.
2002/0163819 A1 11/2002 Treece
2004/0081871 A1 4/2004 Kearl et al.
2004/0150366 A1 8/2004 Ferrall et al.
2005/0095474 A1 * 5/2005 Rainville .......... H01M 8/04089 429/444
2006/0010866 A1 1/2006 Rehg et al.
2007/0077459 A1 * 4/2007 Walton, II ......... H01M 8/04014 429/513
2008/0155984 A1 7/2008 Liu et al.
2010/0133475 A1 6/2010 Kobayashi et al.
2010/0159303 A1 6/2010 Rock et al.
2011/0071707 A1 3/2011 Crumm et al.
2012/0161512 A1 6/2012 Metzler et al.
2012/0301814 A1 11/2012 Beasley et al.
2013/0076120 A1 3/2013 Wagner et al.
2013/0099560 A1 4/2013 Shipley et al.
2013/0112807 A1 5/2013 Cox et al.
2013/0187007 A1 * 7/2013 Mackin ..................... F02C 9/18 60/785
2013/0280634 A1 10/2013 Park et al.
2014/0023945 A1 1/2014 Epstein et al.
2014/0325991 A1 11/2014 Liew et al.
2015/0030947 A1 1/2015 Saunders et al.
2015/0151844 A1 6/2015 Anton et al.
2016/0260991 A1 9/2016 Shapiro et al.
2017/0070088 A1 3/2017 Bernsten et al.
2017/0226934 A1 * 8/2017 Robic ....................... F02K 3/06
2017/0227013 A1 * 8/2017 Kumar .................. F02B 37/225
2017/0248315 A1 * 8/2017 Hannwacker ............. F02C 7/20
2017/0324100 A1 * 11/2017 Mathie .............. H01M 8/04395
2017/0363014 A1 * 12/2017 Taylor ....................... F02K 3/06
2018/0003072 A1 1/2018 Lents et al.
2018/0009536 A1 * 1/2018 Christopherson ..... F01D 17/145
2018/0141675 A1 5/2018 Halsey et al.
2018/0166734 A1 6/2018 Linde et al.

(56) References Cited

U.S. PATENT DOCUMENTS

| | | | | |
|---|---|---|---|---|
| 2018/0319283 | A1 | 11/2018 | Battin et al. | |
| 2019/0121369 | A1 | 4/2019 | DiRusso et al. | |
| 2019/0136761 | A1 | 5/2019 | Shapiro et al. | |
| 2019/0145273 | A1 | 5/2019 | Frank et al. | |
| 2020/0014044 | A1 | 1/2020 | Tichy et al. | |
| 2020/0062414 | A1 | 2/2020 | Hon et al. | |
| 2020/0136163 | A1 | 4/2020 | Holland et al. | |
| 2020/0149479 | A1 | 5/2020 | Des Roches-Dionne et al. | |
| 2020/0194799 | A1 | 6/2020 | Hart et al. | |
| 2020/0248619 | A1* | 8/2020 | Romero | F02C 9/18 |
| 2020/0250693 | A1 | 8/2020 | Kanamori et al. | |
| 2020/0313207 | A1 | 10/2020 | Milcarek et al. | |
| 2020/0340486 | A1 | 10/2020 | Reynolds et al. | |
| 2020/0350640 | A1 | 11/2020 | Combs et al. | |
| 2021/0003281 | A1 | 1/2021 | Amble et al. | |
| 2021/0075034 | A1 | 3/2021 | Irie et al. | |
| 2021/0115857 | A1 | 4/2021 | Collopy | |
| 2023/0120297 | A1* | 4/2023 | Butler | F02C 6/10 290/52 |
| 2023/0203989 | A1* | 6/2023 | Morgan | F02C 3/06 290/52 |
| 2023/0211889 | A1* | 7/2023 | Wang | B64D 27/24 244/53 R |

FOREIGN PATENT DOCUMENTS

| | | | | |
|---|---|---|---|---|
| EP | 967676 | A1 * | 12/1999 | B64D 41/00 |
| EP | 3805107 | A1 | 4/2021 | |
| JP | 2009187756 | A | 8/2009 | |
| JP | 2011002308 | A | 1/2011 | |
| JP | 2018087501 | A | 6/2018 | |
| KR | 20090064853 | A | 6/2009 | |
| WO | WO2018108962 | A1 | 6/2018 | |
| WO | WO2020/011380 | A1 | 1/2020 | |

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb5la8f713ca211b68&mc=true&node=pt14.1.33&rgn=div5#se14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

* cited by examiner

ANTI-STALL SYSTEM WITH A FUEL CELL

FIELD

The present disclosure relates to an anti-stall system of a propulsion system including a fuel cell and a method of operating the same.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

Rotating airfoils in the compressor section may stall during operation. Stalls may occur when an angle of attack of these airfoils goes beyond a critical angle of attack, disturbing flow through to succeeding downstream airfoils in the compressor section. Compressor stall events can result in inefficiency and damage to an engine. Effective and efficient avoidance of compressor stall should be provided.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
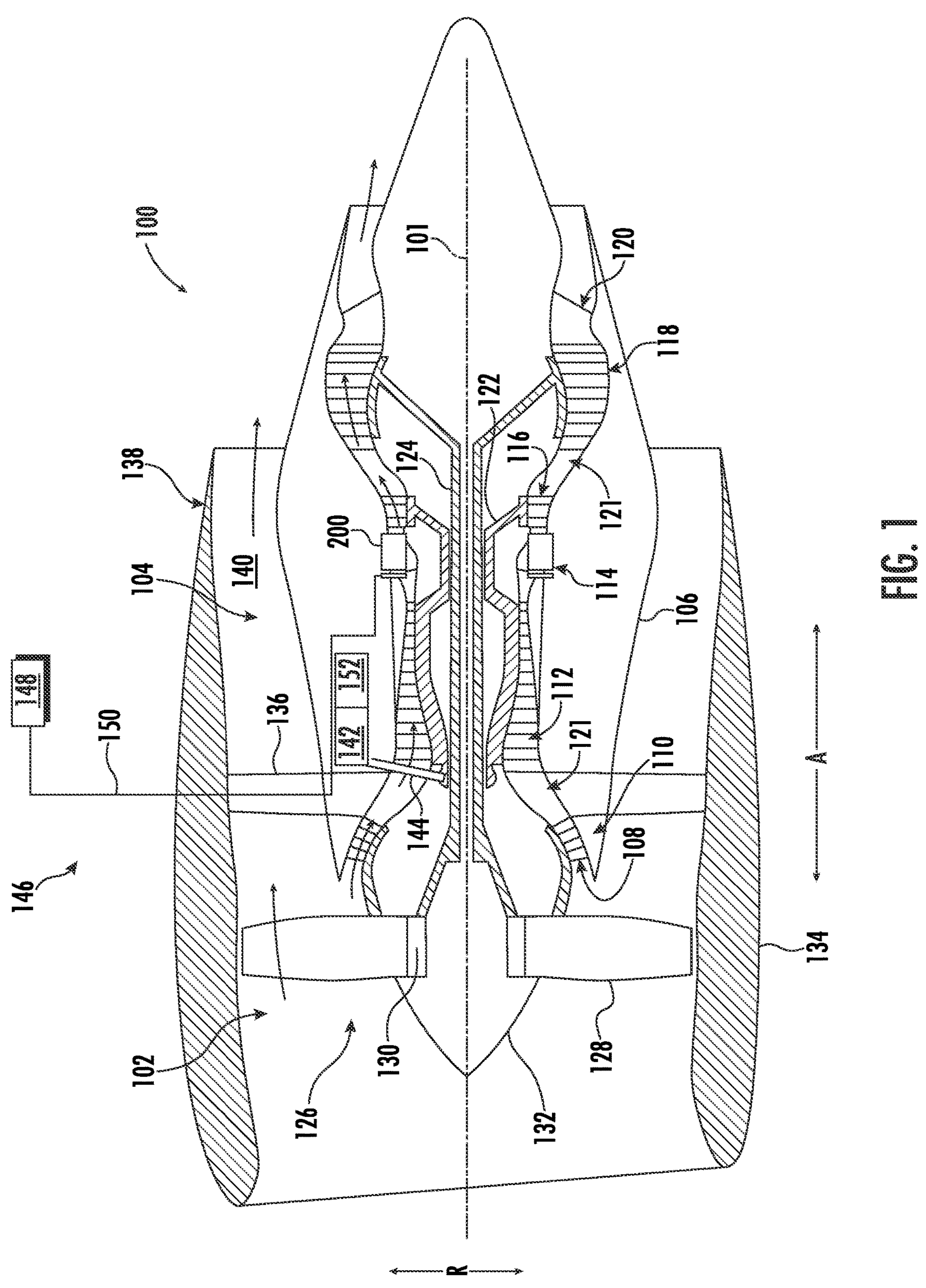
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "combustion engine" refers to turbomachinery components used in generation of a torque output through forces imparted by combustion reactions. The combustion engine may be described independently of other propulsion or power generation components such as electrical or fuel cell components.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., —er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

A system and method are provided for operating a propulsion system for an aircraft. The propulsion system includes a fuel cell assembly comprising a fuel cell, the fuel cell defining an outlet positioned to remove output products from the fuel cell. The propulsion system further includes a combustion engine, such as a turbomachine, the turbomachine including a combustion section configured to receive a flow of aviation fuel from an aircraft fuel supply of the aircraft and further configured to receive the output products from the fuel cell. The system and method are generally configured to determine if at least one operating parameter has achieved a compressor stall condition threshold, for example indicative of a potential or an imminent stall of the compressor. If it is determined that the compressor stall condition threshold has been achieved, then the system and method are configured to execute an anti-stall action. The anti-stall action is configured to adjust at least one fuel cell parameter.

A system and method according to the present disclosure may generally result in an efficient and effective management of potential compressor stall conditions by adjusting at least one fuel cell parameter to leverage operational effects of a fuel cell assembly integrated into the combustor assembly. Using the fuel cell assembly to at least in part facilitate anti-stall systems and methods can advantageously use bled flow from the compressor section, thus limiting energy loss during a compressor bleed.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations, and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power, and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
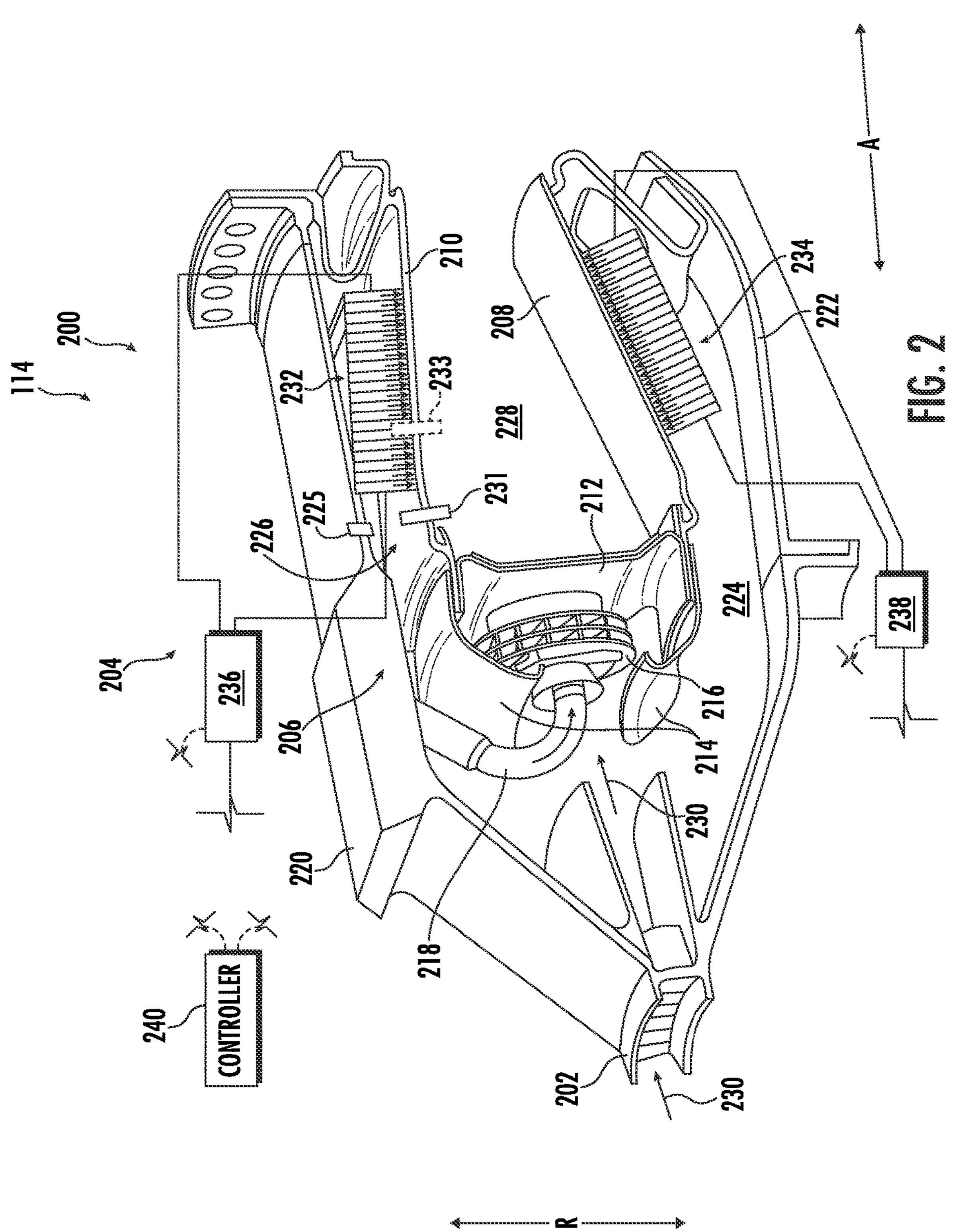
FIG. 2 is a perspective view of an integrated fuel cell and combustor assembly in accordance with the present disclosure.

Referring now to FIG. 2, illustrated schematically is a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner

208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206. As will be described in greater detail below, a purge gas inlet 225 may be provided for the inner passageway 224.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below. Also as described in more detail below, the purge gas inlet 225 may be provided in fluid communication with one or more of the first fuel cell stack 232 and the second fuel cell stack 234, for example providing airflow directly to at least one of the first fuel cell stack 232 and the second fuel cell stack 234.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In general, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 5.

Figure 3:
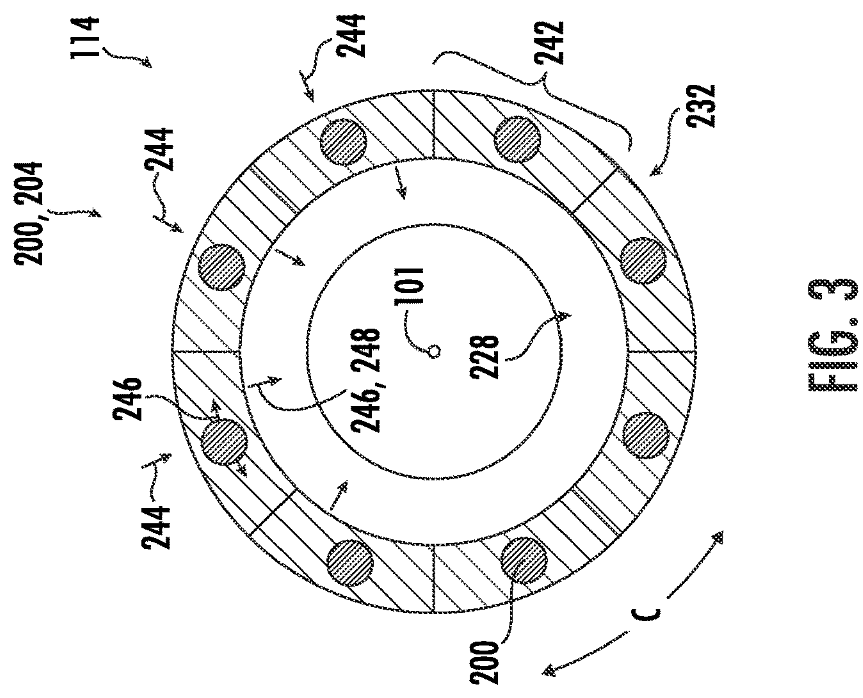
FIG. 3 is a schematic, axial view of the exemplary integrated fuel cell and combustor assembly of FIG. 2.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Figure 4:
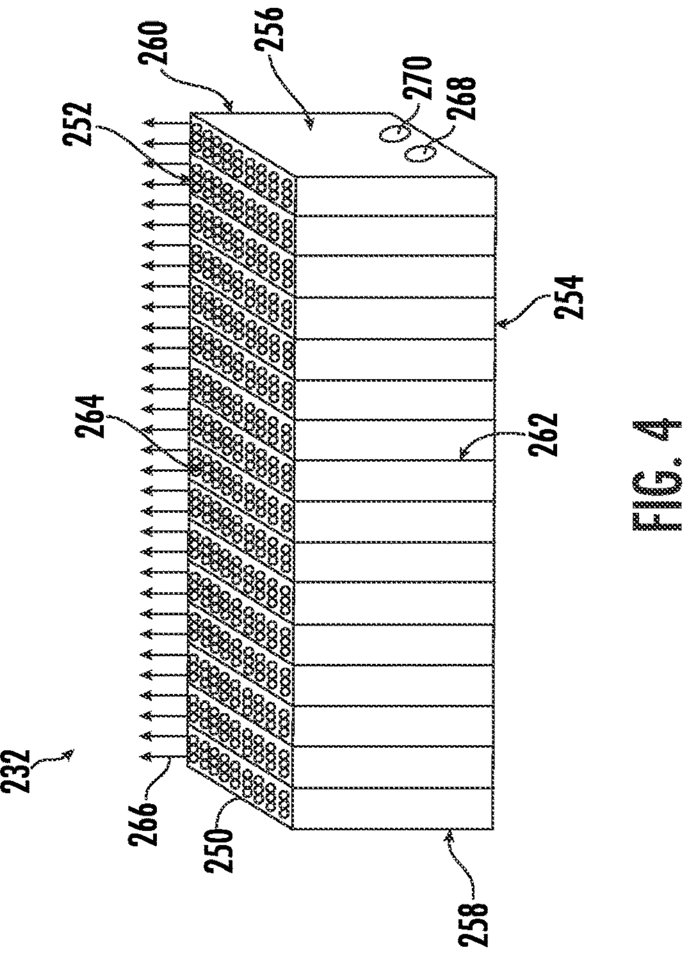
FIG. 4 is a schematic view of a fuel cell of a fuel cell assembly in accordance with an exemplary aspect of the present disclosure as may be incorporated into the exemplary integrated fuel cell and combustor assembly of FIG. 2.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258 and the side 254 are not visible in the perspective view of FIG. 4.

As will be appreciated, the first fuel cell stack 232 may include a plurality of fuel cells that are “stacked,” e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as “output products”) is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gasses used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2, may be configured in a similar manner as the first fuel cell stack 232, or alternatively may be configured in any other suitable manner.

Figure 5:
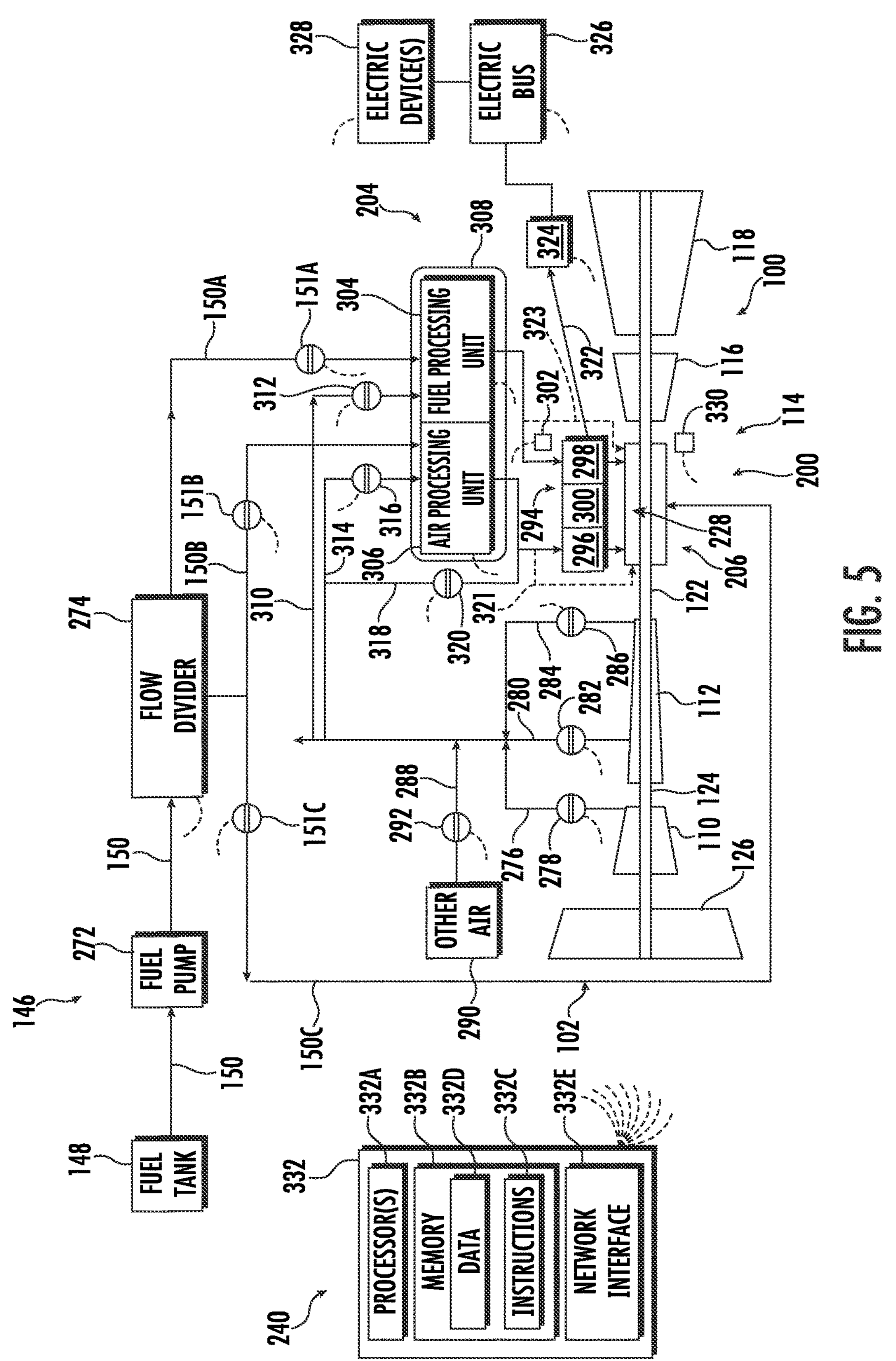
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell), and/or a composition (e.g., a chemical composition) of the output products from the fuel cell assembly 204.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas.

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of the combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor ($CPO_x$) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294. It should be appreciated that the fuel processing unit 304 may thus provide a reformed fuel using a fuel reformer as described herein. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode 552 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell 294 to allow a portion or all of an airflow conditioned by the air processing unit 306 (and combined with any bypass air through duct 318) to bypass the cathode side 296 of the fuel cell 294 and go directly to the combustion chamber 228. The airflow bypass duct 321 may be in thermal communication with the fuel cell 294. The fuel cell assembly further includes a fuel bypass duct 323 extending around the fuel cell 294 to allow a portion or all of a reformed fuel from the fuel processing unit 304 to bypass the anode side 298 of the fuel cell 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be adapted to draw an electric current from, or apply an electrical load to, the fuel cell stack 294. The one or more additional electrical devices 328 may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146

(flow divider 274, valves 151A, 151B, 151C), as well as the sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of outputs (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., method 600), as described herein, and/or any other operations or functions of the one or more computing device(s) 332. The instructions 332C can be software written in any suitable programming language or can be implemented in hardware. Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery assembly 146 is configured to provide hydrogen fuel to the integrated fuel cell and combustor assembly 200, and in particular to the fuel cell assembly 204.

Figure 6:
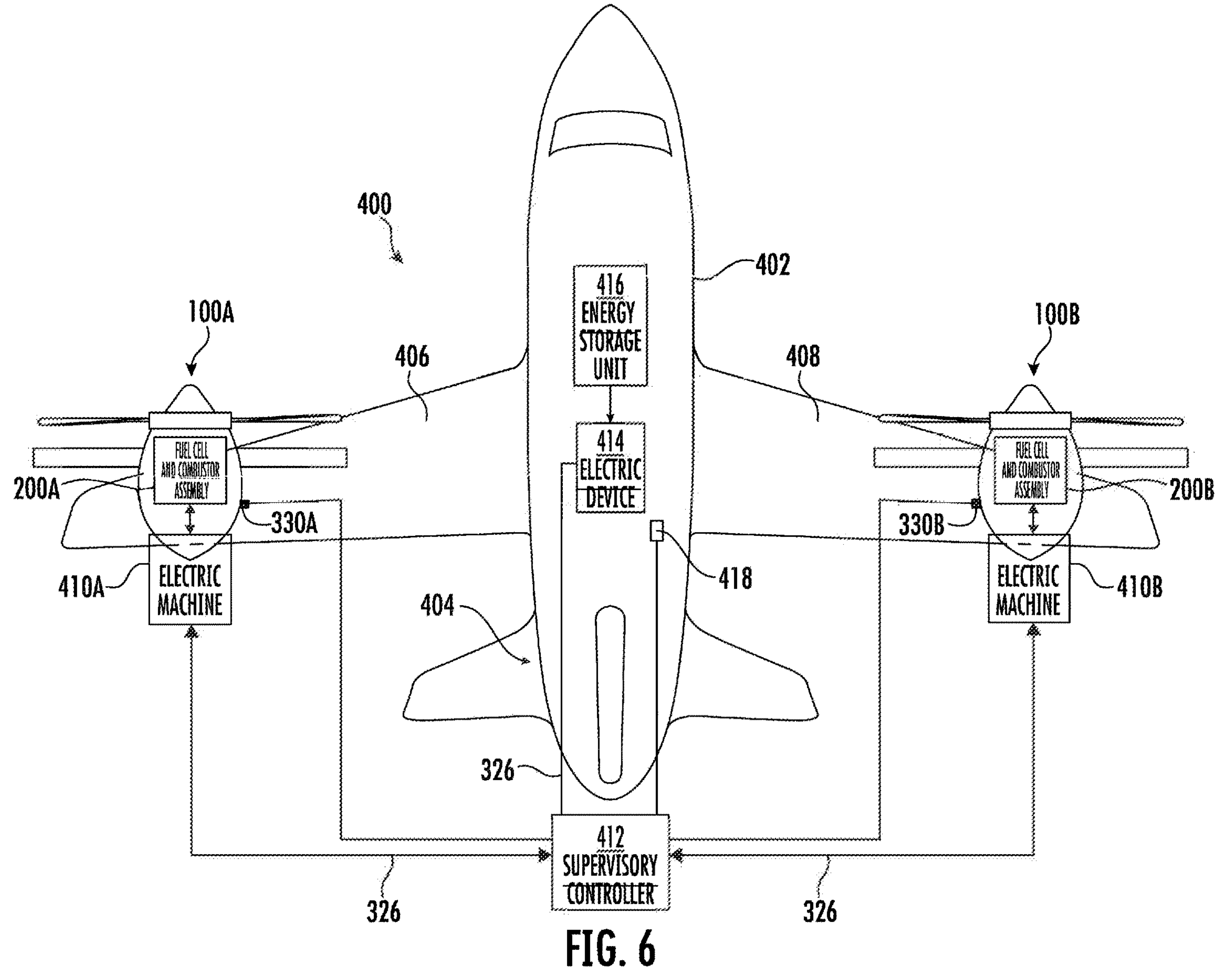
FIG. 6 is a schematic view of a vehicle and propulsion system in accordance with an exemplary aspect of the present disclosure.

As briefly mentioned above, the fuel cell assembly 204 may be in electrical communication with the electric bus 326, which may be an electric bus of the gas turbine engine 100, of an aircraft, or a combination thereof. Referring now briefly to FIG. 6, a schematic view is provided of an aircraft 400 in accordance with an embodiment of the present disclosure including one or more gas turbine engines 100 (labeled 100A and 100B), each with an integrated fuel cell and combustor assembly 200 (labeled 200A and 200B), and an aircraft electric bus 326 in electrical communication with the one or more gas turbine engines 100.

In particular, for the exemplary embodiment depicted, the aircraft 400 is provided including a fuselage 402, an empennage 404, a first wing 406, a second wing 408, and a propulsion system. The propulsion system generally includes a first gas turbine engine 100A coupled to, or integrated with, the first wing 406 and a second gas turbine engine 100B coupled to, or integrated with, the second wing 408. It will be appreciated, however, that in other embodiments, any other suitable number and or configuration of gas turbine engines 100 may be provided (e.g., fuselage-mounted, empennage-mounted, etc.).

The first gas turbine engine 100A generally includes a first integrated fuel cell and combustor assembly 200A and a first electric machine 410A. The first integrated fuel cell and combustor assembly 200A may generally include a first fuel cell assembly. The first electric machine 410A may be an embedded electric machine, an offset electric machine (e.g., rotatable with the gas turbine engine 100 through an accessory gearbox or suitable geartrain), etc. For example, in certain exemplary embodiments, the first electric machine 410A may be a starter motor/generator for the first gas turbine engine 100A.

Similarly, the second gas turbine engine 100B generally includes a second integrated fuel cell and combustor assembly 200B and a second electric machine 410B. The second integrated fuel cell and combustor assembly 200B may generally include a second fuel cell assembly. The second electric machine 410B may also be an embedded electric machine, an offset electric machine (e.g., rotatable with the gas turbine engine 100 through an accessory gearbox or suitable geartrain), etc. For example, in certain exemplary embodiments, the second electric machine 410B may be a starter motor/generator for the second gas turbine engine 100B.

In the embodiment of FIG. 6, the aircraft 400 additionally includes the electric bus 326 and a supervisory controller 412. Further, it will be appreciated that the aircraft 400 and/or propulsion system includes one or more electric devices 414 and an electric energy storage unit 416, each in electric communication with the electric bus 326. The electric devices 414 may represent one or more aircraft power loads (e.g., avionics systems, control systems, electric propulsors, etc.), one or more electric power sources (e.g., an auxiliary power unit), etc. The electric energy storage unit 416 may be, e.g., a battery pack or the like for storing electric power.

The electric bus 326 further electrically connects to the first electric machine 410A and first fuel cell assembly, as well as to the second electric machine 410B and second fuel cell assembly. The supervisory controller 412 may be configured in a similar manner as the controller 240 of FIG. 5 or may be in operative communication with a first gas turbine engine controller dedicated to the first gas turbine engine 100A and a second gas turbine engine controller dedicated to the second gas turbine engine 100B.

In such a manner, it will be appreciated that the supervisory controller 412 may be configured to receive data from a gas turbine engine sensor 330A of the first gas turbine engine 100A and from a gas turbine engine sensor 330B of the second gas turbine engine 100B, and may further be configured to send data (e.g., commands) to various control elements (such as valves) of the first and second gas turbine engines 100A, 100B.

Moreover, it will be appreciated that for the embodiment depicted, the aircraft 400 includes one or more aircraft sensor(s) 418 configured to sense data indicative of various flight operations of the aircraft 400, including, e.g., altitude, ambient temperature, ambient pressure, airflow speed, etc. The supervisory controller 412 is operably connected to these aircraft sensor(s) 418 to receive data from such aircraft sensor(s) 418.

In addition to receiving data from sensors 330A, 330B, 418 and sending data to control elements, the supervisory controller 412 is configured to control a flow of electric power through the electric bus 326. For example, the supervisory controller 412 may be configured to command and receive a desired power extraction from one or more of the electric machines (e.g., the first electric machine 410A and second electric machine 410B), one or more of the fuel cell assemblies (e.g., the first fuel cell assembly and second fuel cell assembly), or both, and provide all or a portion of the extracted electric power to other of the one or more of the electric machines (e.g., the first electric machine 410A and second electric machine 410B), one or more of the fuel cell assemblies (e.g., the first fuel cell assembly and second fuel cell assembly), or both. One or more of these actions may be taken in accordance with the logic outlined below.

Figure 7:
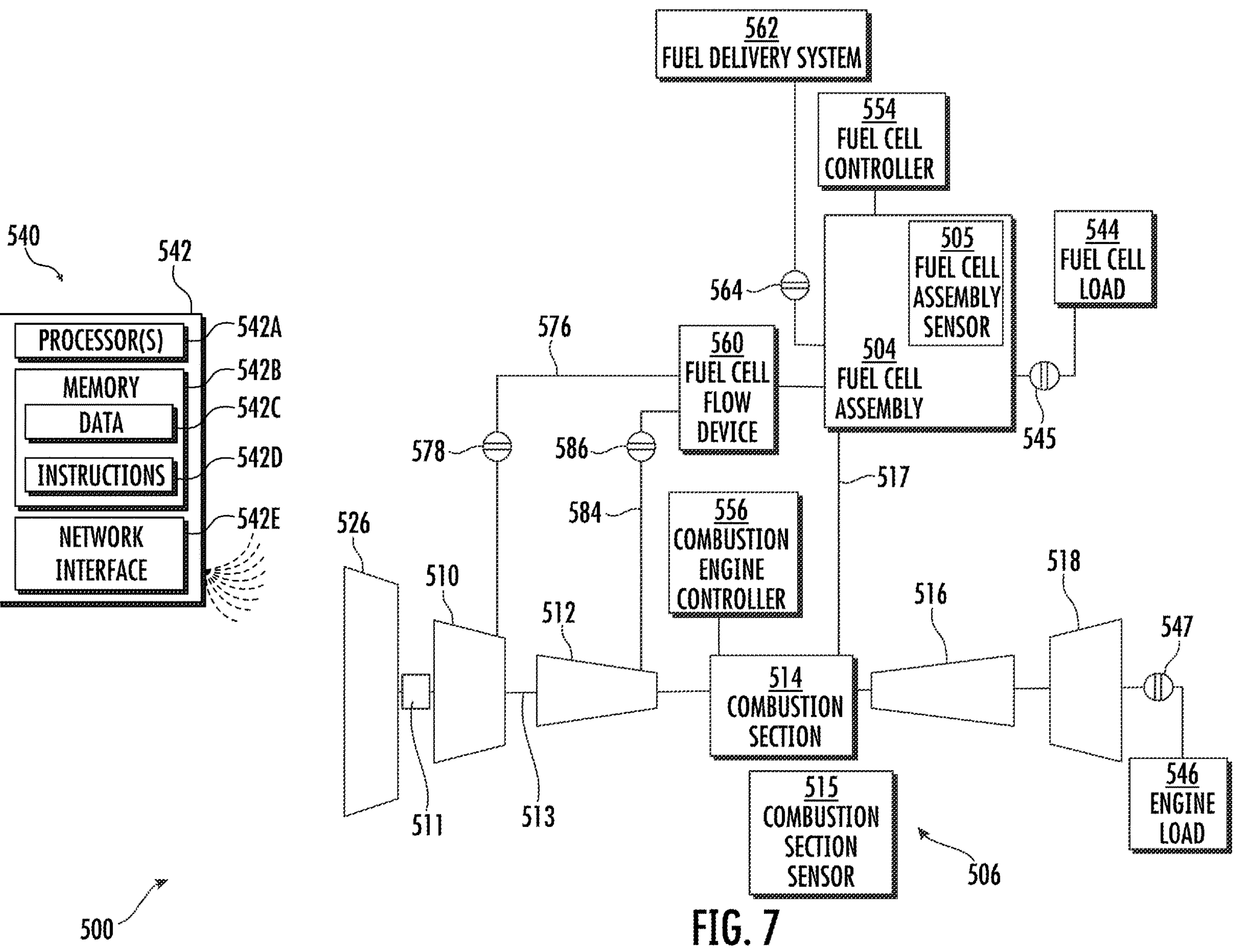
FIG. 7 is a schematic diagram of an anti-stall system for a gas turbine engine in accordance with an exemplary aspect of the present disclosure.

Turning now to FIG. 7, an anti-stall system 500 is depicted in schematic form. The anti-stall system 500 depicted includes a fuel cell assembly 504, a combustion engine 506, and a controller 540. The fuel cell assembly 504 and the combustion engine 506 may form distinct portions of the gas turbine engine 100 of FIG. 1. For example, the fuel cell assembly 504 may be operably connected with the combustion engine 506 through a fuel cell combustion engine interface 517. As described in greater detail above with reference to FIGS. 2-4, the fuel cell assembly 504 and the combustion engine 506 may form an integrated component of the gas turbine engine 100, but nonetheless may still be defined and controlled separately based on independent operation capabilities.

It should be appreciated that the fuel cell assembly 504 schematically depicted in FIG. 7 may include any of the features described elsewhere herein with respect to other embodiments. Various sensors may be provided, for example as described with reference to the fuel cell sensor 302 of FIG. 5. The embodiment of FIG. 7 depicts a fuel cell assembly sensor 505, which may be disposed within the fuel cell assembly 504. For example, the fuel cell assembly sensor 505 may be disposed proximate but external to a first fuel cell stack (not shown) and/or proximate but external to the fuel cell assembly 504. The fuel cell assembly sensor 505 may for example be disposed external to the fuel cell assembly 504 for monitoring the fuel cell assembly 504 or its surrounding conditions. It should be appreciated that the fuel cell sensor 505 as depicted may include a plurality of sensors disposed at various locations within or proximate to the fuel cell assembly 504.

A fuel cell load 544 is depicted in FIG. 7 as operably connected to the fuel cell assembly 504, and may be connected through a fuel cell load control 545. The fuel cell load 544 may be any number of electrical or mechanical loads drawing energy from the fuel cell assembly 504. As described in greater detail below, the fuel cell load control 545 may be operable with a controller 540, for example to turn off, turn on, increase, or decrease a load on the fuel cell assembly 504.

A fuel cell controller 554 may also be provided. For example, the fuel cell controller 554 may be operable to control the fuel cell load control 545. The fuel cell controller 554 may also be provided to increase, decrease, turn on, or shut off output of the fuel cell 504. Output of the fuel cell 504 may be controlled by various mechanisms described in greater detail with reference to FIG. 5 above.

Turning now to the depicted combustion engine 506 of FIG. 7, the combustion engine 506 includes a fan 526, an LP compressor 510, an HP compressor 512, a combustion section 514, an HP turbine 516, and an LP turbine 518. Each of these components may be configured as described in greater detail with reference to FIG. 5 above. A variety of sensors may also be provided, for example as described with reference to the gas turbine engine sensor 330 of FIG. 5. As shown in FIG. 7, the combustion engine 506 includes a turbomachine sensor 511. The turbomachine sensor 511 may be configured to measure various operating parameters of the turbomachine (see FIG. 1). For example, the turbomachine sensor 511 may be configured to detect a rotation speed, a temperature, a gas concentration, or a flow rate of or at one or more turbomachinery components. In an embodiment, the turbomachine sensor 511 is configured to measure a rotational speed of at least one engine shaft 513, for example one or both of the HP shaft 122 or the LP shaft 124 described in greater detail with reference to FIG. 5.

As described above, the anti-stall system 500 may be configured to detect and mitigate stall conditions affecting the LP compressor 510, the HP compressor 512, or both. Anti-stall actions can include controlling an amount of air bypass from one or more sections of the LP compressor 510 and/or the HP compressor 512. For example, where a pressure ratio is incompatible with a given rotational speed of the combustion engine 506, controlling bleed may be operable to adjust the pressure ratio as required. In various embodiments, a pressure ratio at a given location in the LP compressor 510 and/or the HP compressor 512 can be increased by bleeding flow from a downstream location, and can be decreased by bleeding flow from an upstream location.

As discussed above with reference to FIG. 5, the fuel cell assembly 504 is configured to perform useful work in the form of the fuel cell power output 322 from air and fuel input. The anti-stall system 500 depicted in FIG. 7 is configured to leverage air bled to provide a usable energy output from the fuel cell assembly 504, for example providing more power to the fuel cell load 544. Airflow provided to fuel cell during anti-stall operations may be received through a fuel cell flow device 560. As used herein, the fuel cell flow device 560 is configured to receive bleed flow from the compressor section of the combustion engine 506 and to provide flow to the fuel cell 504. For example, the fuel cell flow device 560 depicted in FIG. 7 is configured to receive flow from the LP compressor 510 through first bleed flow path 576 regulated by a first bleed flow valve 578 and to receive flow from the HP compressor through a second bleed flow path 584 regulated by a second bleed flow valve 586. However, it should be appreciated that more or fewer bleed flow paths may be provided from various locations in the compressor section.

The fuel cell flow device 560 may be a simple continuation of one or more flow paths into the fuel cell assembly 504. The fuel cell flow device 560 may also be configured to manage combined flow, for example between the first bleed flow path 576 and the second bleed flow path 584. In this example, the relatively low pressure flow of the first bleed flow path 576 from the LP compressor 510 may be combined with the relatively high pressure flow of the second bleed flow path 584 from the HP compressor 512, thus providing a flow having an intermediate pressure greater than that of the first bleed flow path 576 but less than that of the second bleed flow path 584. As will be discussed in greater detail below with reference to FIG. 9, the fuel cell flow device may be configured to entrain a relatively low pressure flow with a relatively high pressure flow to provide a laminar flow having an intermediate pressure into the fuel cell assembly 504.

As described above, the fuel cell flow device 560 may be configured to increase a pressure of at least one flow, for example from the first bleed flow path 576, prior to delivering that flow to the fuel cell assembly 504. As described in greater detail below, pressure may further be increased through mechanical input into a compressor embodiment of the fuel cell flow device 560. Accordingly, the fuel cell flow device 560 may be configured to increase a pressure beyond a threshold sufficient to provide flow to the fuel cell assembly 504. For example, the fuel cell flow device 560 may be configured to increase a pressure of at least one bypass flow to be greater than a combustion chamber pressure or pressure within the fuel cell assembly 504.

Still referring to FIG. 7, a fuel delivery system 562 may be provided, for example in a manner described with reference to FIG. 5 above. As depicted in FIG. 7, the fuel delivery system 562 includes a fuel delivery valve 564. As with regulation of the fuel cell flow device 560 described above, it should be appreciated that regulating such a fuel delivery system 562 may serve to adjust one or more fuel cell parameters affecting operation of the fuel cell assembly 504.

The anti-stall system 500 may also be configured to control the combustion engine 506, for example to regulate one or more combustion engine parameters affecting operation of the combustion engine 506. The combustion engine 506 as depicted in FIG. 7 is connected to a combustion engine load 546. The combustion engine load 546 may generally include resistance to thrust or rotation of the engine. Additionally, the combustion engine load 546 may include an auxiliary load such as an electric generator. The combustion engine load 546 may be regulated, such as with a combustion engine load control 547. This combustion engine load control 547 may include any number of electronic or mechanical devices to turn on, turn off, reduce, or increase load on the combustion engine 506. Controlling of the combustion engine 506 may thus include control of various valves, actuators, etc. in a fuel delivery system, bleed air system, or variable geometry actuation system. Such control may be used regulate fuel or air flow into or out of a combustion engine, temperatures of the combustion engine, and other variables. As described in greater detail below, the combustion engine load control 547 may be operable through the controller 540. Although the combustion engine load 546 is depicted in connection with the LP turbine, it should be appreciated that the combustion engine load 546 may draw energy from the combustion engine 506 at various other locations and from various other components.

The combustion engine 506 of FIG. 7 also includes a combustion engine controller 556. The combustion engine controller 506 may be configured to operate the combustion engine load control 547 as described above. The combustion engine controller 556 may also be configured to regulate an output of the combustion engine 506, for example, by shutting off, turning on, increasing, or reducing output. Regulating output of the combustion engine 506 may be performed in various ways, such as regulating airflow or fuel flow through the combustion engine 506. Although the combustion engine controller 556 is depicted in connection with the combustion section 514, it should be appreciated that the combustion engine controller 556 may be operably connected to various components of the combustion engine 506.

FIG. 7 also depicts another embodiment of a controller 540. For example, the controller 540 may be a standalone controller, a gas turbine engine controller (e.g., a full authority digital engine control, or FADEC, controller), an aircraft controller, supervisory controller for a propulsion system, a combination thereof, etc. The controller 540 may be operably connected to various other controllers. For example, the controller 540 may be operably connected with the fuel cell controller 554 and the combustion engine controller 556. In various embodiments, the controllers 540, 554, 556 may be wirelessly connected or connected with wired electrical connections, or may each be integrated into a single controller. It should be understood that the fuel cell controller 554 and the combustion engine controller 556 may also be configured to operate independently, either during normal operation or in case of disconnection from the controller 540.

In the depicted anti-stall system 500, the controller 540 is operably connected to various sensors, valves, etc. within, connected to, or in proximity to the fuel cell assembly 504 and the combustion engine 506. More specifically, for the exemplary aspect depicted, the controller 540 is operably connected to the fuel cell assembly sensor 505, the combustion section sensor 515, and the turbomachine sensor 511. As will be appreciated from the description below, the controller 540 may be in wired or wireless communication with these components. For example, the controller 540 may communicate to each of the various sensors through the fuel cell controller 554 and the combustion engine controller 556. In this manner, the controller 540 may receive data from a variety of inputs (including the fuel cell controller 554 and its associated sensors and the combustion engine controller 556 and its associated sensors), may make control decisions, and may provide data (e.g., instructions) to a variety of outputs such as energy output from the combustion engine 506, energy output from the fuel cell assembly 504, the combustion engine load control 546, the fuel cell load control 545, the first bleed flow valve 578, the second bleed flow valve 586, the fuel delivery valve (further including the additional or alternative valves of the compressor bleed system to control an airflow bleed from the compressor section, the airflow delivery system to direct the airflow bled from the compressor section, and the fuel delivery system 146 to direct the fuel flow within the gas turbine engine 100 as described with reference to FIG. 5). It should also be appreciated that the controller 540 may also be directly connected to one or more of the inputs and outputs, for example, of the fuel cell controller 554 and/or the combustion engine controller 556.

Referring particularly to the operation of the controller 540, in at least certain embodiments, the controller 540 can include one or more computing device(s) 542. The computing device(s) 542 can include one or more processor(s) 542A and one or more memory device(s) 542B. The one or more processor(s) 542A can include any suitable processing device, such as a microprocessor, microcontroller, integrated circuit, logic device, and/or other suitable processing device. The one or more memory device(s) 542B can include one or more computer-readable media, including, but not limited to, non-transitory computer-readable media, RAM, ROM, hard drives, flash drives, and/or other memory devices.

The one or more memory device(s) 542B can store information accessible by the one or more processor(s) 542A, including computer-readable instructions 542C that can be executed by the one or more processor(s) 542A as described in greater detail with reference to FIG. 5 above. The memory device(s) 542B can further store data 542D that can be accessed by the processor(s) 542A as also described above.

The computing device(s) 542 also includes a network interface 542E configured to communicate, for example, with the fuel cell controller 554 and the combustion engine controller 556, as well as with other components of the gas turbine engine 100 (such as the valves of the compressor bleed system (valves 278, 282, 286, 578, 586), the airflow delivery system (valves 312, 316, 320), and the fuel delivery system 146 (flow divider 274, valves 151A, 151B, 151C, and valve 564), as well as the sensor turbomachine sensor 511, the combustion section sensor 515, and the fuel cell assembly sensor 505), and/or the aircraft incorporating the gas turbine engine 100, etc.

The schematic representation in FIG. 7 of the fuel cell combustion engine interface 517 may be representative of the integrated fuel cell and combustor assembly 200 as described with reference to FIG. 5 above. Although no direct control communication between the fuel cell assembly 504 and the combustion engine 506 is depicted in FIG. 7, it should be understood that control pathways as described in greater detail below may also travel across such a fuel cell combustion engine interface 517. For example, communication from the controller 540 may travel from its network interface 542E to the combustion engine controller 556, where the combustion engine controller 556 then relays communication, or transmits communication responsive to communication from the controller 540, to the fuel cell controller 554. Various network interfaces, wired or wireless, may also be configured between the controller 540, the combustion engine controller 556, and/or the fuel cell controller 554.

The various sensors described herein may be configured to detect data indicative of stall conditions in the compressor section. A stall condition, as used herein, may refer to an active stall or an imminent or probable stall. It should be appreciated that various data points can be used alone or in combination to make a determination as to stall conditions. For example, sensors may be disposed in at least one of fuel nozzle, compressor discharge valve, compressor section, combustor section, fuel conduit, and/or air inlet. It should be appreciated that, particularly in embodiments employing mathematical models to detect stall conditions, it is conceivable that any of the sensors described herein may be used to detect data indicative of a stall condition.

Once data indicative of stall conditions is sensed or detected, that data may be used to determine whether a compressor stall condition threshold has been achieved. Accordingly, the data, used individually or in the aggregate, can be used as an operating parameter measured relative to the compressor stall condition threshold. For example, data indicative of engine rotational speed, for example collected by the turbomachine sensor 511, may be compared with data related to pressure in at least one portion of the compressor section to determine a stall margin, or proximity to conditions causing compressor stall. A minimum acceptable stall margin may correspond to the compressor stall condition threshold, such that when the compressor stall condition threshold has been achieved, the actual stall margin is less than the minimum acceptable stall margin. It should be appreciated that the minimum acceptable stall margin may be a tunable figure depending on use case, for example based at least in part on the likely effects of a compressor stall.

As described above, data can be combined in various ways to determine stall margin or whether or not a compressor stall condition threshold has been achieved. For example, various physics-based models, statistical models, artificial intelligence models, or a combination thereof may be used. In an embodiment, a hybrid model employing two or more of these model types is employed to determine whether at least one operating parameter has achieved a compressor stall condition threshold. It should be appreciated that various statistical models employed herein may include a compressor pressure model, a matched filter model, a precursor model, or any combination thereof. Various physics-based models may include a Moore-Greitzer compressor model, a Fink compressor model, a Botros compressor model, or any combination thereof.

Once it has been determined that the at least one operating parameter has achieved the compressor stall condition threshold, the anti-stall system 500 shown in FIG. 7 may execute one or more anti-stall actions. As described above, the anti-stall system 500 beneficially adjusts at least one fuel cell parameter responsive to this determination. Adjusting the at least one fuel cell parameter may include regulating fuel cell current and/or fuel utilization of the fuel cell assembly 504. The at least one fuel cell parameter may be further adjusted by controlling an air/fuel ratio of the fuel cell assembly, for example by controlling the first bleed flow valve 578, the second bleed flow valve 586, and/or the fuel delivery valve 564. Additionally, the fuel cell load 544 may be regulated to increase or decrease load on the fuel cell assembly 504.

It should be appreciated that adjusting the at least one fuel cell parameter may be operable to alleviate stall conditions in various ways. For example, the at least one fuel cell parameter may be adjusted to facilitate handling of more flow from the first bleed flow path 576 and/or the second bleed flow path 584, thus facilitating useful work by the fuel cell assembly 504 from flow that the combustion engine 506 has already worked to compress. Thus, the anti-stall system 500 can increase at least one bypass flow to the fuel cell assembly 504 to potentially maintain or increase stall margin. Additionally or alternatively, a fuel supply to the fuel cell assembly 504, such as the fuel delivery system 562, may be increased or decreased, for example by the fuel delivery valve 564. Yet further, the fuel cell 504 may additionally or alternatively be operated to increase output of the fuel cell assembly 504 to electrically provide torque to the engine shaft 513, for example through driving an electric machine embodiment of the combustion engine load 546. Further still, adjusting fuel cell exhaust gas composition and/or enthalpy via adjustments to current, fuel utilization, and/or air to fuel ratio of the fuel cell assembly may be used to in turn affect the compressor stall condition.

Figure 8:
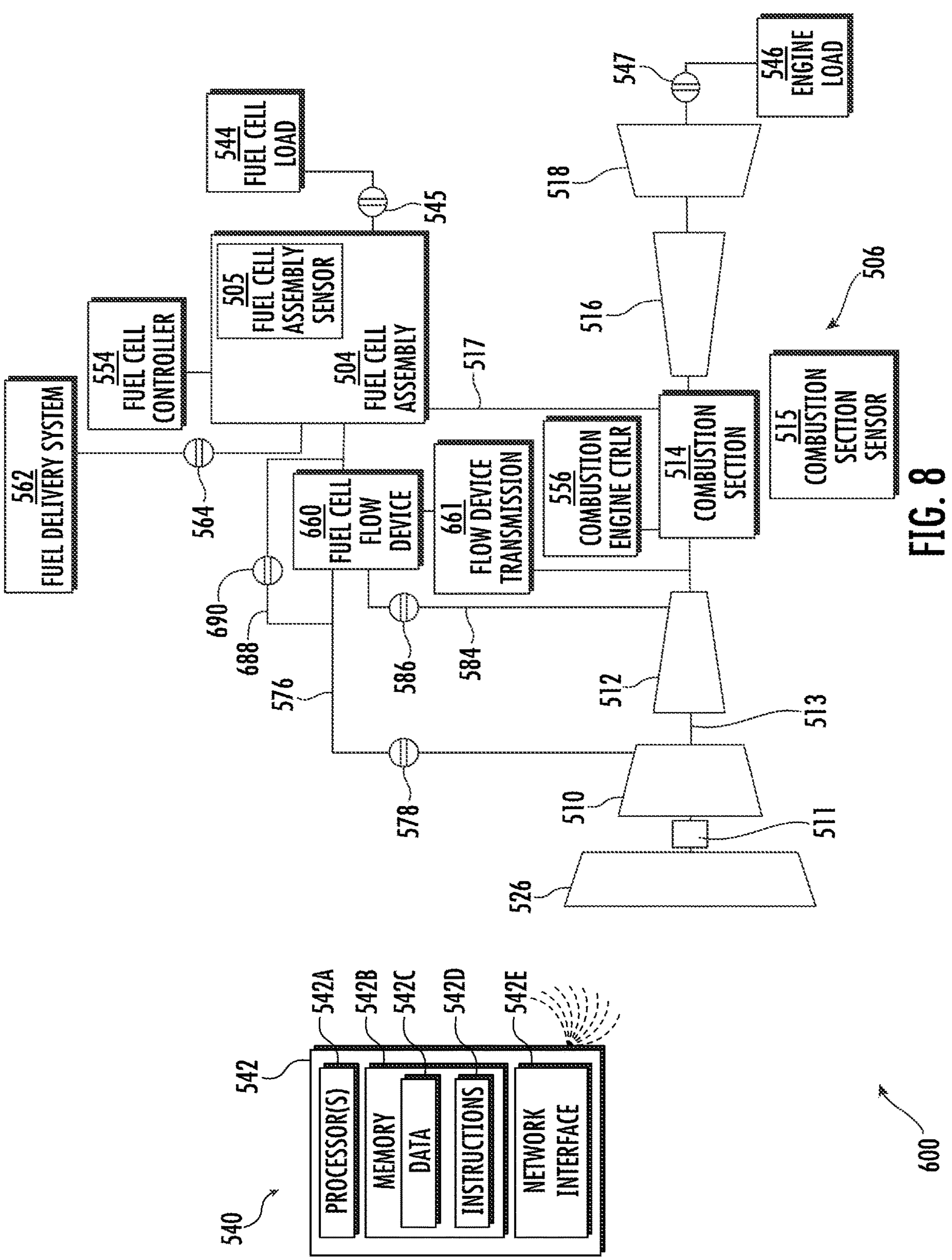
FIG. 8 is a schematic diagram of an anti-stall system for a gas turbine engine in accordance with another exemplary aspect of the present disclosure.

Turning now to FIG. 8, another embodiment of an anti-stall system 600 is provided. The embodiment of FIG. 8 differs from that of FIG. 7 in that it further includes an embodiment of a fuel cell flow device 660 that is operable to compress flow. In various embodiments, the fuel cell flow device 660 is configured to receive a motive force from the propulsion system, inclusive of the fuel cell assembly 504 and the combustion engine 506. For example, the fuel cell flow device 660 may be mechanically connected to the engine shaft 513, for example by a flow device transmission 661. The flow device transmission 661 may have a fixed ratio configured to provide an appropriate torque and rotational speed to the flow device 660 given a range of operating conditions of the engine shaft 513. Alternatively, the flow device transmission 661 may be variable and tunable to regulate operation of the flow device 660. It should also be appreciated that the flow device 660 may be drivable pneumatically, hydraulically, or electrically, for example by an electric machine (not shown) powered by the fuel cell assembly 504 and/or the combustion engine 506.

The fuel cell flow device 660 of FIG. 8 may be configured to increase a pressure of flow entering the fuel cell assembly 504, for example to ensure sufficient operation of the fuel cell assembly 504 to alleviate stall conditions as described above. This embodiment of the fuel cell flow device 660 may be referred to as a secondary compressor. The fuel cell flow device 660 may thus receive at least one bypass flow from at least one secondary compressor inlet (e.g. from the first bleed flow path 576, the second bleed flow path 584, etc.), increase pressure of that flow, and communicate the flow having increased pressure to the fuel cell assembly 504 from a secondary compressor outlet 663.

It is conceivable in this embodiment that such a configuration of the fuel cell flow device 660 may be susceptible to stall itself, as it may rely on fixed compressor blades (not shown) handling variable airflows. In various embodiments, a recirculation flow path 688 may be provided to alleviate stall conditions of the fuel cell flow device 660 and/or to maintain preferred operating conditions. The recirculation flow path 688 may be controlled by a recirculation control device 690, for example a proportioning valve configured to regulate flow through between the secondary compressor outlet 663 and the recirculation flow path 688. Accordingly, recirculation flow may be diverted from downstream of the fuel cell flow device 660 to upstream of the fuel cell flow device 660, for example to the one or more secondary compressor inlets (shown herein as the first bleed flow path 576 and the second bleed flow path 584). As described above with reference to FIG. 7, it should be appreciated that the recirculation control device 690 may provide further control to alleviate compressor stall conditions by improving and/or maintaining function of the fuel cell flow device 660.

Figure 9:
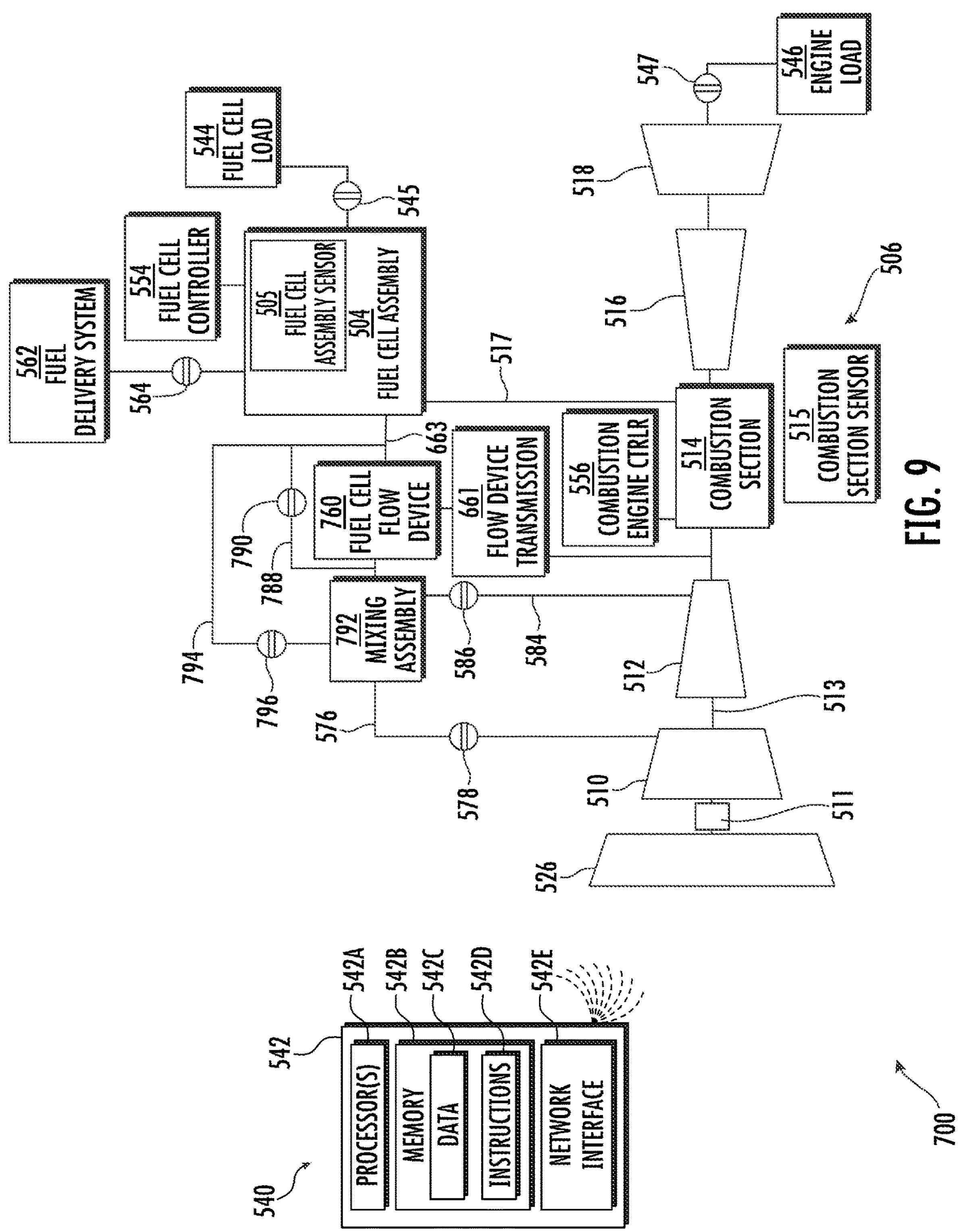
FIG. 9 is a schematic diagram of an anti-stall system for a gas turbine engine in accordance with yet another exemplary aspect of the present disclosure.

Turning now to FIG. 9, another embodiment of an anti-stall system 700 is provided. The embodiment of FIG. 9 differs from that of FIG. 8 in that it further includes an embodiment of a fuel cell flow device 760 that is operable to compress flow through the use of at least one mixing assembly 792. The at least one mixing assembly 792 may be used alone, as generally described above with reference to FIG. 7 (describing the fuel cell flow device 560 as a continuation of one or more flow paths into the fuel cell assembly 504) and entrainment of low pressure flow with high pressure flow, or in combination with a driven embodiment of the fuel cell flow device 760 as described with reference to FIG. 8. The mixing assembly 792 as depicted in FIG. 9 is configured to receive a flow from downstream of the fuel cell flow device 760 via a mixing path 794 regulated by a mixing control device 796, which may comprise at least one valve. Relatively high pressure flow from the mixing path 794 may be used to entrain relatively low pressure flow from the first bleed flow path 576 and/or the second bleed flow path 584, providing a relatively smooth and usable flow of intermediate pressure to the fuel cell flow device 760 and/or the fuel cell assembly 504. In various embodiments, a recirculation flow path 788 may be provided to alleviate stall conditions of the fuel cell flow device 760 and/or to maintain preferred operating conditions. The recirculation flow path 788 may be controlled by a recirculation control device 790, for example a proportioning valve configured to regulate flow through between the secondary compressor outlet 663 and the recirculation flow path 788.

Described generally, the mixing assembly 792 is configured to receive a first bypass flow having a first pressure and a second bypass flow having a second pressure greater than the first pressure. Accordingly, embodiments of the mixing assembly 792 may include at least two inlets and at least one outlet. The second bypass flow is used to entrain the first bypass flow and the combined flow, having a pressure greater than the first pressure but less than the second pressure is communicated downstream towards the fuel cell assembly 504. It should be appreciated that embodiments of the mixing assembly 792 could be applied to flows such as the first and second bleed flows 576, 584 as described with reference to FIG. 7 above, and/or to one or both of the first and second bleed flows 576, 584 entrained with flow from the mixing path 794 as described herein with reference to FIG. 9.

In certain exemplary embodiments, the mixing assembly may be configured as an ejector. In such a manner, the mixing assembly may be configured to receive a relatively high pressure airflow (e.g., the bleed flow from a location downstream of the secondary compressor 760) and use such relatively high pressure airflow to increase a pressure and/or flowrate of a relatively low pressure airflow (e.g., the bleed flow at a location upstream of the secondary compressor 760). In such a manner, it will be appreciated that the mixing assembly may conserve an energy within the bleed airflow.

Figure 10:
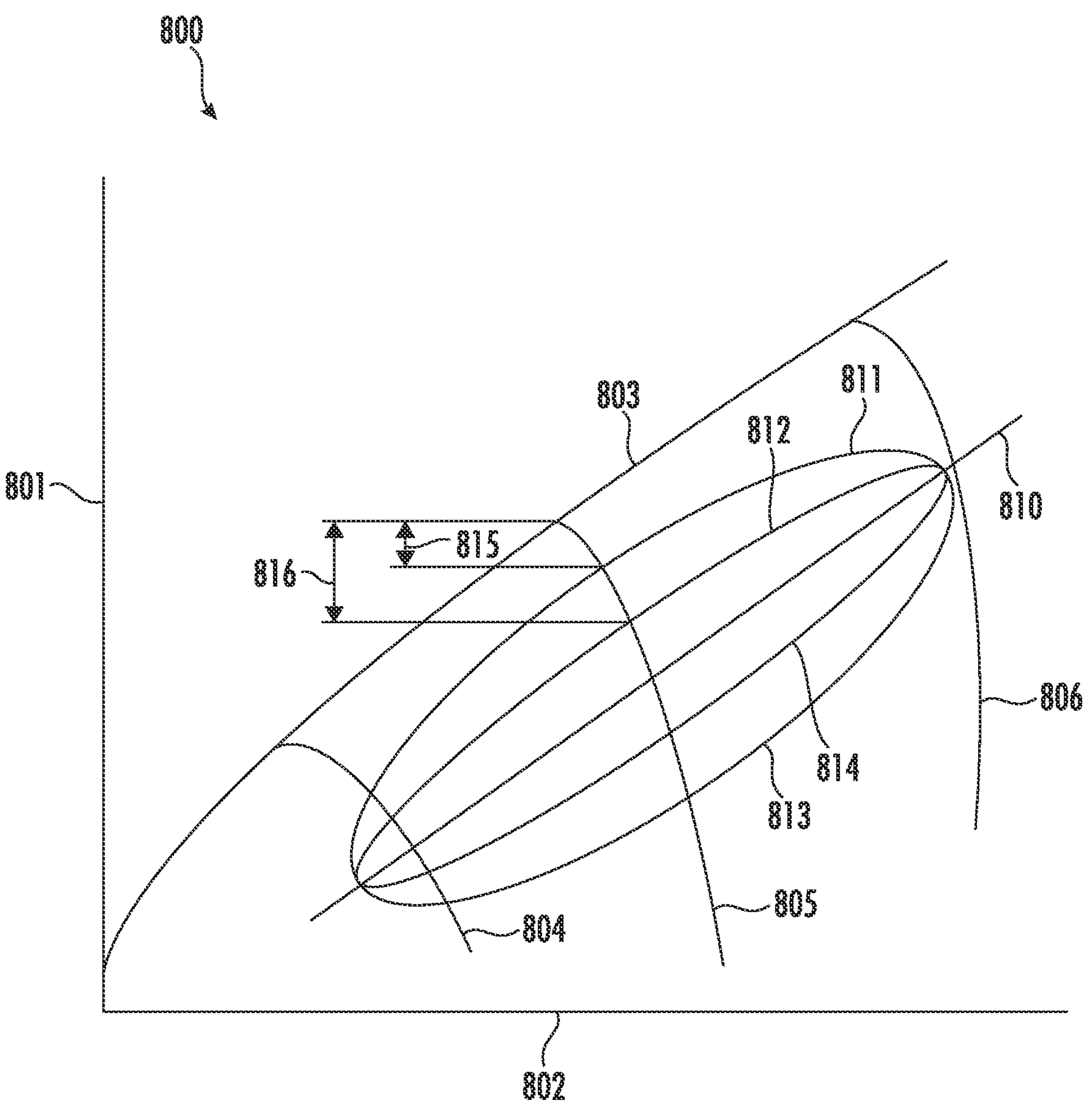
FIG. 10 is a schematic chart of operability according to exemplary aspects of the present disclosure.

Turning now to FIG. 10, a chart 800 is provided to illustrate the mechanisms and effects of the present disclosure. As discussed above with reference to the embodiments of FIGS. 7-9, various configurations and methods may be employed to increase stall margin and increase operability. The chart 800 of FIG. 10 may be referred to as a compressor map, indicative of operability of at least one compressor portion. For example, the chart 800 of FIG. 10 may indicate operability of at least one stage of the LP compressor 110, 510, the HP compressor 112, 512, or both. The chart 800 plots a pressure ratio 801 on its vertical axis against a mass flow rate 802 on its horizontal axis. A surge line 803, also referred to as a stall line, is provided to indicate at which areas in the chart 800 surge or stall conditions are expected. As can be seen in the chart 800, generally as the pressure ratio 801 increases, the mass flow rate 802 must also increase to avoid crossing the surge or stall line 803 into compressor stall conditions.

Still referring to FIG. 10, various constant speed lines are shown, representative of a given rotational speed of the engine, for example measured at the engine shaft 513 or various other rotating components as described elsewhere herein. A first constant speed line 804 is representative of a relatively low operating speed, for example an idle speed without load. A second constant speed line 805 is representative of an intermediate operating speed, for example a cruising speed. A third constant speed line 806 is representative of a relatively high operating speed, for example a maximum engine speed or a takeoff speed. As can be seen from the chart 800, the constant speed lines 804, 805, 806 can be used to represent a relationship between the pressure ratio 801 and the mass flow rate 802 while maintaining a constant speed.

FIG. 10 also depicts a steady state operating line 810, indicative of the pressure ratio 801 and the mass flow rate 802 to maintain a given constant speed without acceleration. On either side of the steady state operating line 810 is a first positive acceleration line 811 and a first negative acceleration line 813, each representative of operability without employing the configurations and methods of the present disclosure. The first positive acceleration line 811 is representative of the pressure ratio 801 and the mass flow rate 802 at a given rotational speed during acceleration. The first negative acceleration line 813 is representative of the pressure ratio 801 and the mass flow rate 802 at a given rotational speed during deceleration. As can be seen from the chart 800, acceleration results in a decreased distance from the surge line 803. This distance from the surge line 803 is referred to as a stall margin, represented at the second constant speed line 805 as a first stall margin 815.

A second stall margin 816 is provided according to the configurations and methods of the present disclosure. Compared with the first stall margin 815, the second stall margin 816 is increased, thus increasing engine operability. The second stall margin 816 is derived at the same exemplary second constant speed line 805 by a second positive acceleration line 812. The second positive acceleration line 812 and a second negative acceleration line 814 represent beneficial changes to compressor function according to the configurations and methods described herein. For example, the mass flow rate 802 at the second constant speed line 812 can be increased by controlling at least one fuel cell parameter (e.g. increasing a flow to the fuel cell assembly 504, increasing output products or output enthalpy from the fuel cell assembly 504, etc.) The resulting second stall margin 816 represents an improvement in operating margin leading to high operability or flexibility for engine operation. Additionally or alternatively to increasing engine operability, the configurations and methods according to the present disclosure may also be employed to increase engine efficiency. For example, a reduced fuel burn may be possible as, for example, waste heat from bleed air is used for power generation and/or engine thrust augmentation.

Figure 11:
FIG. 11 is a flow diagram of a method of operation of an anti-stall system for a gas turbine engine in accordance with an exemplary aspect of the present disclosure.
Figure 11:
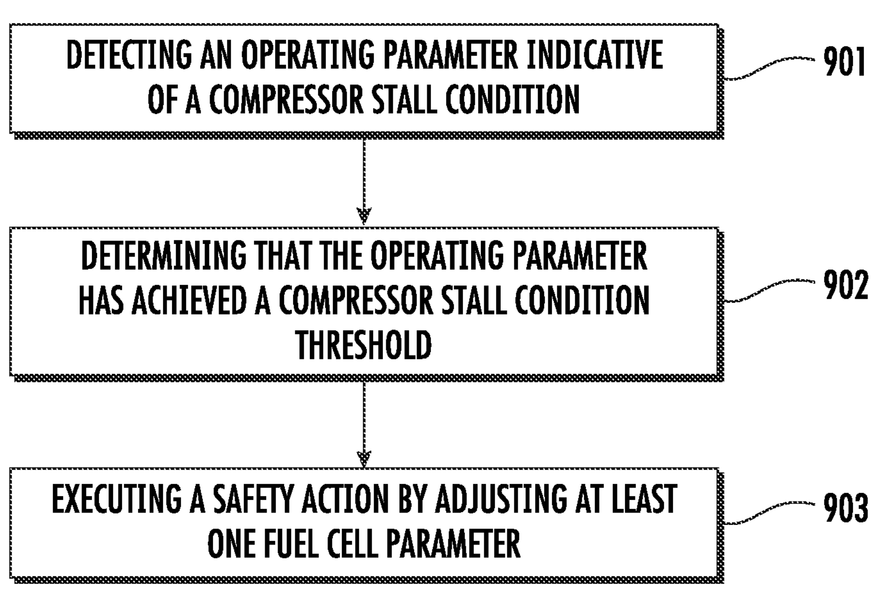

Turning now to FIG. 11, a flow diagram describing operation of a propulsion system for an aircraft, and more specifically a method 900 for operating an anti-stall system 500, 600, 700 for the aircraft and its propulsion system, is provided. As described with reference to FIG. 7, the anti-stall system 500 includes at least one sensor, for example any of the sensors described with reference to FIG. 7 above or any conceivable sensor applicable to a sensing model as described therein. As shown in a first process 901 of FIG. 11, these sensors may be configured to determine data indicative of at least one operating parameter of the propulsion system. It should be understood that the propulsion system as referred to herein is inclusive of at least the combustion engine 506 and the fuel cell assembly 504 (see FIG. 7). As described above, a processor, such as the processor(s) 542A or processor(s) of the fuel cell controller 554 or the combustion engine controller 556, is configured to make determinations based on inputs from the sensors (see FIG. 7). For example, the processor(s) 542A can be configured to determine if the at least one operating parameter has achieved a compressor stall condition threshold in a second process 902.

In a third process 903, the processor or another processor proceeds with executing an anti-stall action if it is determined that the operating parameter has achieved the compressor stall condition threshold in the second process 902. The anti-stall action includes adjusting at least one fuel cell parameter, as described generally with reference to FIGS. 7-10 above. It should also be appreciated that such an anti-stall method may additionally adjust further parameters, such as combustion engine parameters as described above.

In addition to executing an anti-stall action in 903 as described above with reference to FIGS. 7-10, the method may further transmit one or more messages to an operator, such as an aircraft pilot. Accordingly, the method 900 may further comprise transmitting a stall condition message to a pilot responsive to determining that the operating parameter has achieved the compressor stall condition threshold. Finally, the method may proceed to determining that the operating parameter has not achieved the compressor stall condition threshold, for example by repeating process 901. If it is determined that the operating parameter has not achieved the compressor stall condition threshold, then the method may proceed without executing an anti-stall action or by ceasing execution of an anti-stall action if one has already been executed.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An anti-stall system for an aircraft, the aircraft comprising a propulsion system including a fuel cell assembly and a combustion engine, the combustion engine comprising a compressor section having a compressor, the anti-stall system comprising: at least one sensor configured to sense data indicative of at least one operating parameter indicative of a compressor stall condition of the compressor; and a controller comprising a processor and memory storing instructions that when executed by the processor cause the controller to: determine that the at least one operating parameter has achieved a compressor stall condition threshold; and execute an anti-stall action responsive to determining that the at least one operating parameter has achieved the compression stall condition threshold, wherein the anti-stall action is configured to adjust at least one fuel cell parameter.

The anti-stall system of the preceding clause, wherein the at least one fuel cell parameter includes: a current output of the fuel cell assembly; a fuel utilization of the fuel cell assembly; an air to fuel ratio of a fuel cell stack of the fuel cell assembly; a power ratio between fuel cell assembly and the combustion engine; a power ratio between the fuel cell assembly and an electric machine driven by the combustion engine; or any combination thereof.

The anti-stall system of any of the preceding clauses, wherein the combustion engine is configured as a turbomachine comprising a combustion section having a combustor, wherein the fuel cell assembly comprises a fuel cell defining an outlet positioned to remove output products from the fuel cell and provide the output products to the combustor, wherein a combustor output power of the combustor is controlled by adjusting the fuel cell operating parameter.

The anti-stall system of any of the preceding clauses, wherein the combustion engine is configured as a turbomachine having a shaft and an electric machine rotatable with the shaft, wherein adjusting the at least one fuel cell parameter comprises adjusting a fuel cell power output to the electric machine.

The anti-stall system of any of the preceding clauses, wherein adjusting the at least one fuel cell parameter includes adjusting the electric machine based on an acceleration of the shaft.

The anti-stall system of any of the preceding clauses, wherein adjusting the at least one fuel cell parameter includes increasing a pressure, a flow rate, or both of at least one bypass flow from the compressor to the fuel cell assembly.

The anti-stall system of any of the preceding clauses, wherein adjusting the at least one fuel cell parameter includes increasing a pressure of the at least one bypass flow to be greater than a combustion chamber pressure.

The anti-stall system of any of the preceding clauses, further comprising: a secondary compressor configured to: receive the at least one bypass flow at a secondary compressor inlet; increase a pressure of the at least one bypass flow; and communicate the at least one bypass flow to the fuel cell assembly with a secondary compressor outlet.

The anti-stall system of any of the preceding clauses, wherein the secondary compressor is further configured to receive a torque input from a shaft of the combustion engine.

The anti-stall system of any of the preceding clauses, further comprising a secondary compressor transmission, wherein the secondary compressor transmission is configured to control a rotational output speed of the secondary compressor.

The anti-stall system of any of the preceding clauses, wherein the secondary compressor is configured to receive a motive force from an electric machine.

The anti-stall system of any of the preceding clauses, wherein the secondary compressor is further configured to receive a motive force from the propulsion system.

The anti-stall system of any of the preceding clauses, wherein the secondary compressor is configured to receive power from the fuel cell assembly.

The anti-stall system of any of the preceding clauses, further comprising a recirculation flow, the recirculation flow configured to divert at least a portion of flow downstream of the secondary compressor outlet to upstream of the secondary compressor inlet.

The anti-stall system of any of the preceding clauses, further comprising a recirculation control device, the recirculation control device configured to control a proportion of the recirculation flow diverted to upstream of the secondary compressor inlet.

The anti-stall system of any of the preceding clauses, further comprising a mixing assembly, the mixing assembly configured to entrain the at least one bypass flow upstream of the secondary compressor inlet with at least a portion of the recirculation flow.

The anti-stall system of any of the preceding clauses, wherein the secondary compressor comprises a mixing assembly, the mixing assembly configured to: receive a first bypass flow having a first pressure; receive a second bypass flow having a second pressure, wherein the second pressure is greater than the first pressure; entrain the first bypass flow with the second bypass flow; and communicate a combined bypass flow from the secondary compressor outlet, the combined bypass flow having a third pressure, wherein the third pressure is greater than the first pressure and less than the second pressure.

A method of operating an anti-stall system for an aircraft, the aircraft comprising a propulsion system including a fuel cell assembly and a combustion engine, the method comprising: detecting, with at least one sensor, at least one operating parameter indicative of a compressor stall condition; determining, with at least one controller, that the at least one operating parameter has achieved a compressor stall condition threshold; and executing, with the at least one controller, an anti-stall action responsive to the at least one operating parameter having achieved the compressor stall condition threshold, wherein the anti-stall action comprises adjusting at least one fuel cell parameter.

The method of any of the preceding clauses, wherein adjusting the at least one fuel cell parameter comprises controlling at least one bypass flow into the fuel cell assembly.

The method of any of the preceding clauses, wherein adjusting the at least one fuel cell parameter comprises controlling a fuel cell fuel supply.

The method of any of the preceding clauses, further comprising transmitting a stall condition message to a pilot responsive to the at least one operating parameter having achieved the compressor stall condition threshold.

The method of any of the preceding clauses, wherein the anti-stall action further comprises adjusting at least one combustion engine parameter.

The method of any of the preceding clauses, further comprising: determining, with the at least one controller that the at least one operating parameter has not achieved the compressor stall condition threshold; and ceasing execution, of the anti-stall action responsive to the at least one operating parameter having not achieved the compressor stall condition threshold.

We claim:

1. An anti-stall system for an aircraft, the anti-stall system comprising:

a propulsion system including, in serial flow relationship, a low-pressure compressor, a high-pressure compressor, and a combustion section, wherein the propulsion system further comprises a secondary compressor, a fuel cell assembly, an electric bus, an electric machine, and at least one shaft, and wherein the combustion section comprises a combustor including an inner liner, an outer liner, and a combustion chamber defined therebetween, wherein the secondary compressor is fluidly coupled to the low-pressure compressor via a first bleed flow path to receive a first bleed flow from the low-pressure compressor, wherein the secondary compressor is fluidly coupled to the high-pressure compressor via a second bleed flow path to receive a second bleed flow from the high-pressure compressor, wherein the second compressor is in airflow communication with the fuel cell assembly to provide at least one of the first bleed flow or the second bleed flow to the fuel cell assembly, wherein the fuel cell assembly is integrated with the inner liner or the outer liner and is in fluid communication with the combustion chamber, and wherein the electric bus is electrically coupled to the fuel cell assembly and the electric machine;

a sensor configured to sense data indicative of an operating parameter indicative of a compressor stall condition of at least one of the low-pressure compressor or the high-pressure compressor; and a controller electronically coupled to the sensor, wherein the controller is configured to:

receive the data indicative of the operating parameter indicative of the compressor stall condition, wherein receiving the data indicative of the operating parameter comprises receiving data indicative of one or more of a flame in the combustor, rotational speed of the at least one shaft, or a combustion engine load; and execute an anti-stall action responsive to the data indicative of the operating parameter indicative of the compressor stall condition if the operating parameter has achieved a compression stall condition threshold, wherein executing the anti-stall action includes increasing or decreasing at least one fuel cell parameter of the fuel cell assembly.

2. The anti-stall system of claim 1, wherein the at least one fuel cell parameter includes:

a current output of the fuel cell assembly;

a fuel utilization of the fuel cell assembly;

an air to fuel ratio of a fuel cell stack of the fuel cell assembly; or any combination thereof.

3. The anti-stall system of claim 1, wherein the fuel cell assembly comprises a fuel cell defining an outlet positioned to remove output products from the fuel cell and provide the output products to the combustor, wherein a combustor output power of the combustor is controlled by adjusting the at least one fuel cell operating parameter.

4. The anti-stall system of claim 3, wherein the electric machine is rotatable with the at least one shaft, wherein adjusting the at least one fuel cell parameter comprises adjusting a fuel cell power output to the electric machine.

5. The anti-stall system of claim 1, wherein receiving the data indicative of the operating parameter comprises receiving sensor data of a change in rotational speed of the at least one shaft, wherein adjusting the at least one fuel cell parameter includes adjusting the electric machine based on an acceleration of the at least one shaft.

6. The anti-stall system of claim 1, wherein adjusting the at least one fuel cell parameter includes increasing a pressure, a flow rate, or both of at least one of the first bleed flow or the second bleed flow from the secondary compressor to the fuel cell assembly.

7. The anti-stall system of claim 6, wherein adjusting the at least one fuel cell parameter includes increasing the pressure of at least one of the first bleed flow or the second bleed flow to be greater than a combustion chamber pressure.

8. The anti-stall system of claim 6, wherein the secondary compressor is configured to:

receive at least one of the first bleed flow or the second bleed flow at a secondary compressor inlet of the secondary compressor;

increase the pressure of at least one of the first bleed flow or the second bleed flow; and communicate at least one of the first bleed flow or the second bleed flow to the fuel cell assembly with a secondary compressor outlet of the secondary compressor.

9. The anti-stall system of claim 8, wherein the secondary compressor is further configured to receive a motive force from the propulsion system.

10. The anti-stall system of claim 8, wherein the secondary compressor is configured to receive power from the fuel cell assembly.

11. The anti-stall system of claim 8, further comprising a recirculation flow, the recirculation flow configured to divert at least a portion of at least one of the first bleed flow or the second bleed flow downstream of the secondary compressor outlet to upstream of the secondary compressor inlet.

12. The anti-stall system of claim 11, further comprising a recirculation control device, the recirculation control device configured to control a proportion of the recirculation flow diverted to upstream of the secondary compressor inlet.

13. The anti-stall system of claim 12, further comprising a mixing assembly, the mixing assembly configured to entrain at least one of the first bleed flow or the second bleed flow upstream of the secondary compressor inlet with at least a portion of the recirculation flow.

14. The anti-stall system of claim 8, wherein the secondary compressor comprises a mixing assembly, the mixing assembly configured to:

receive the first bleed flow at a first pressure;

receive the second bleed flow at a second pressure, wherein the second pressure is greater than the first pressure;

entrain the first bleed flow with the second bleed flow; and communicate a combined bleed flow from the secondary compressor outlet, the combined bleed flow having a third pressure, wherein the third pressure is greater than the first pressure and less than the second pressure.

15. A method of operating an anti-stall system for an aircraft, the aircraft comprising a propulsion system including, in serial flow relationship, a low-pressure compressor, a high-pressure compressor, and a combustor, the propulsion system further comprising a secondary compressor and a fuel cell assembly, wherein the secondary compressor is fluidly coupled to the low-pressure compressor via a first bleed flow path to receive a first bleed flow from the low-pressure compressor, wherein the secondary compressor is fluidly coupled to the high-pressure compressor via a second bleed flow path to receive a second bleed flow from the high-pressure compressor, wherein the second compressor is in airflow communication with the fuel cell assembly to provide at least one of the first bleed flow or the second bleed flow to the fuel cell assembly, the combustor including an inner liner and an outer liner defining a combustion chamber therebetween, the method comprising:

detecting, with at least one sensor, an operating parameter indicative of a compressor stall condition; and executing, with at least one controller, an anti-stall action responsive to the operating parameter having achieved a compressor stall condition threshold, wherein the anti-stall action comprises increasing or decreasing at least one fuel cell parameter, wherein the fuel cell assembly is integrated with the inner liner or the outer liner and is in fluid communication with the combustion chamber, wherein receiving the data indicative of the compressor stall condition comprises receiving data indicative of rotational speed of at least one shaft of the propulsion system, and receiving sensor data of a change in rotational speed of the at least one shaft of the propulsion system.

16. The method of claim 15, wherein adjusting the at least one fuel cell parameter comprises controlling at least one of the first bleed flow or the second bleed flow into the fuel cell assembly.

17. The method of claim 15, wherein adjusting the at least one fuel cell parameter comprises controlling a fuel cell fuel supply.

18. The method of claim 15, further comprising transmitting a stall condition message to a pilot responsive to the operating parameter having achieved the compressor stall condition threshold.

19. The method of claim 15, wherein the anti-stall action further comprises increasing or decreasing at least one combustion engine parameter.

20. The method of claim 15, further comprising:

ceasing execution, of the anti-stall action if the operating parameter falls below the compressor stall condition threshold.

* * * * *